United States Patent [19]

Kolb, III et al.

[11] 4,109,525

[45] Aug. 29, 1978

[54] MAXIMUM STRENGTH/WEIGHT FLUID METERING DEVICE

[75] Inventors: William Jordan Kolb, III, Waukegan; Karl Otto Laurel, Gurnee, both of Ill.

[73] Assignee: Liquid Controls Corporation, North Chicago, Ill.

[21] Appl. No.: 719,265

[22] Filed: Aug. 31, 1976

[51] Int. Cl.² ............................................. G01F 15/18
[52] U.S. Cl. ................................................. 73/201
[58] Field of Search ........................... 73/201, 273, 431

[56] References Cited

U.S. PATENT DOCUMENTS

| | | | |
|---|---|---|---|
| 427,486 | 6/1890 | Thomson | 73/201 |
| 1,179,759 | 4/1916 | Reynolds | 73/273 X |
| 1,625,428 | 4/1927 | Richards | 73/277 |
| 2,619,837 | 12/1952 | Ford | 73/201 |
| 3,289,476 | 12/1966 | Brette | 73/258 |
| 3,377,858 | 4/1968 | Brette | 73/258 |
| 3,404,569 | 10/1968 | Young | 73/201 X |
| 3,802,266 | 4/1974 | Rittenhouse et al. | 73/273 |

*Primary Examiner*—Herbert Goldstein

[57] ABSTRACT

A metering device carried by and housed within a two part housing, said housing being composed of two matching hemispherical portions, one of which hemispherical portions contains both an inlet and an outlet for the fluid to be metered, whereby the meter assembly may be disassembled for inspection and repair without disturbing any fluid piping, joints or connections, and reassembled and sealed in the shortest possible time.

2 Claims, 4 Drawing Figures

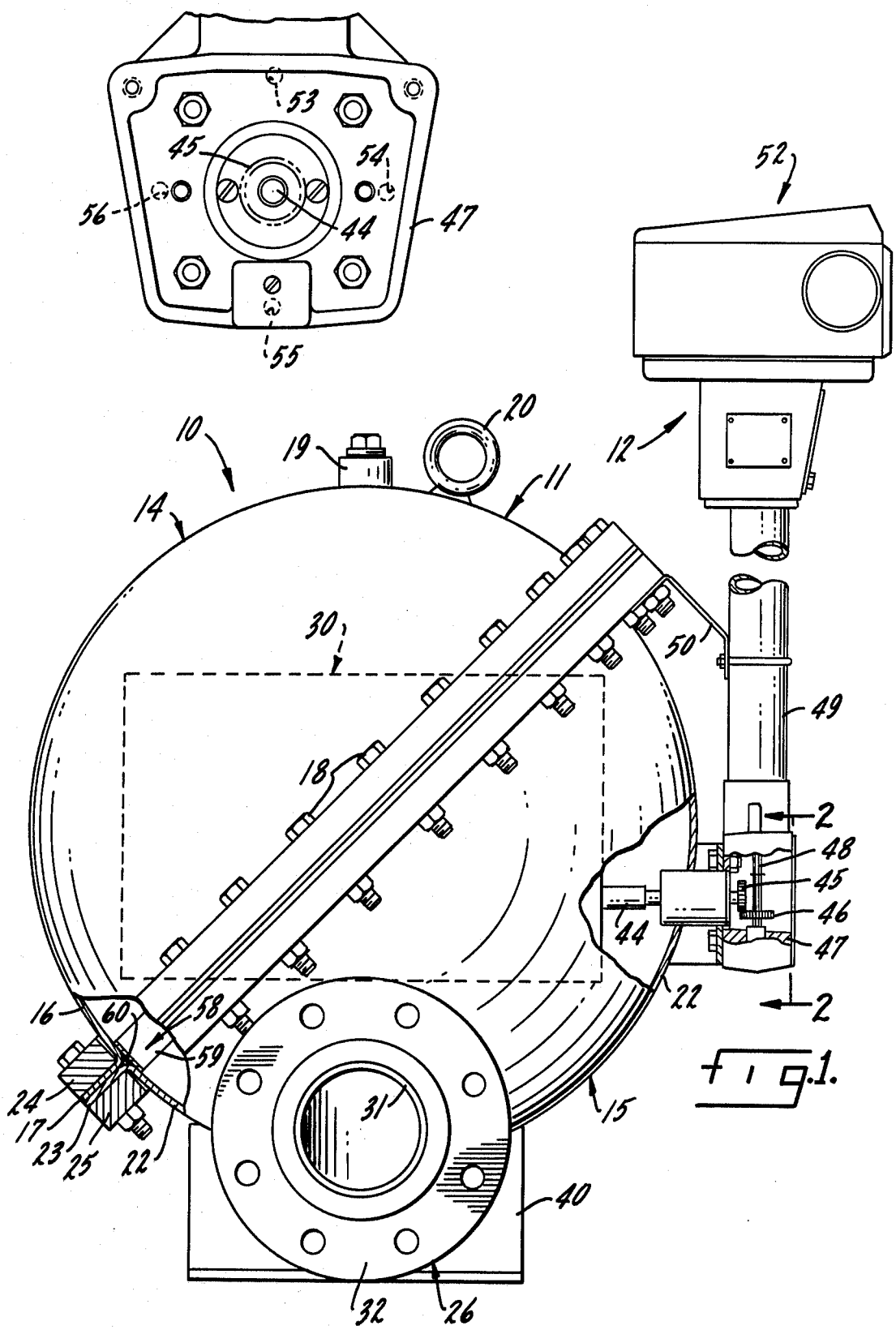

MAXIMUM STRENGTH/WEIGHT FLUID METERING DEVICE

This invention relates to devices for metering fluids, and particularly to a metering device having a unique external housing construction and other features which result in an assembly which is extremely flexible, easy to install and inspect, and has a near maximum strength to weight ratio.

SUMMARY OF THE INVENTION

The invention may be described generally as a meter assembly, which assembly includes a metering device carried by and housed within a two part housing, said housing being composed of two matching hemispherical portions, one of which hemispherical portions contains both an inlet and an outlet for the fluid to be metered, whereby the meter assembly may be disassembled for inspection and repair without disturbing any fluid piping, joints or connections, and reassembled and sealed in the shortest possible time.

Accordingly a primary object of the invention is to provide a meter assembly having a meter housing composed of two complementary, generally hemispherical halves in which the inlet and outlet to the housing are in the same hemispherical half whereby the unit may be disassembled, inspected, cleaned, adjusted and reassembled without disturbing any seals or joints except the hemispherical joint between the two hemispherical halves.

Another object is to provide a meter assembly as above described in which a unique system for sealing the joints between the two halves of the hemispherical housing are provided whereby the possibility of loss of the flexible sealing member, and thereby the accidental reassembly without said sealing member, is minimized.

Another object is to provide a meter assembly as above described in which auxiliary equipment, such as pre-set (or stage closure) valves, tachometers, counters, temperature volume compensators, ticket printers, and/or other desired auxiliary equipment can be assembled to the base meter assembly at any desired location with respect thereto, as, for example, from a position of near-abutting physical proximity to a distance of many feet whereby a relatively large and complicated complete meter installation can be adapted to a physical location in which only sufficient space is available for the basic meter assembly.

Yet another object is to provide a unique hemispherical type meter assembly in which the meter assembly can be installed horizontally or vertically, the direction of fluid approach and departure can be from left to right or vice-versa, and the angular relationship between the entering and departing flow path of the metered fluid can be varied within limits of from less than 90° to 180°, all without loss of accuracy or increase in complexity of construction or installation.

Yet a further object is to provide a basic hemispherical meter assembly which, by addition of a simple internal flexible sleeve seal, bellows seal or equivalent type seal, can be converted from a unitary chamber to a dual chamber meter, and consequently a two pressure meter assembly, and vice-versa.

Other objects and advantages of the invention will be apparent from an understanding of the disclosure as described herein.

The invention is illustrated more or less diagrammatically in the accompanying drawing wherein FIG. 1 is an end elevation view with parts partially broken away for clarity of the complete meter assembly;

FIG. 2 is a partial front view to an enlarged scale as contrasted to FIG. 1 taken substantially along the line 2—2 of FIG. 1;

Like reference numerals will refer to like parts from Figure to Figure in the drawing.

Figure 3:
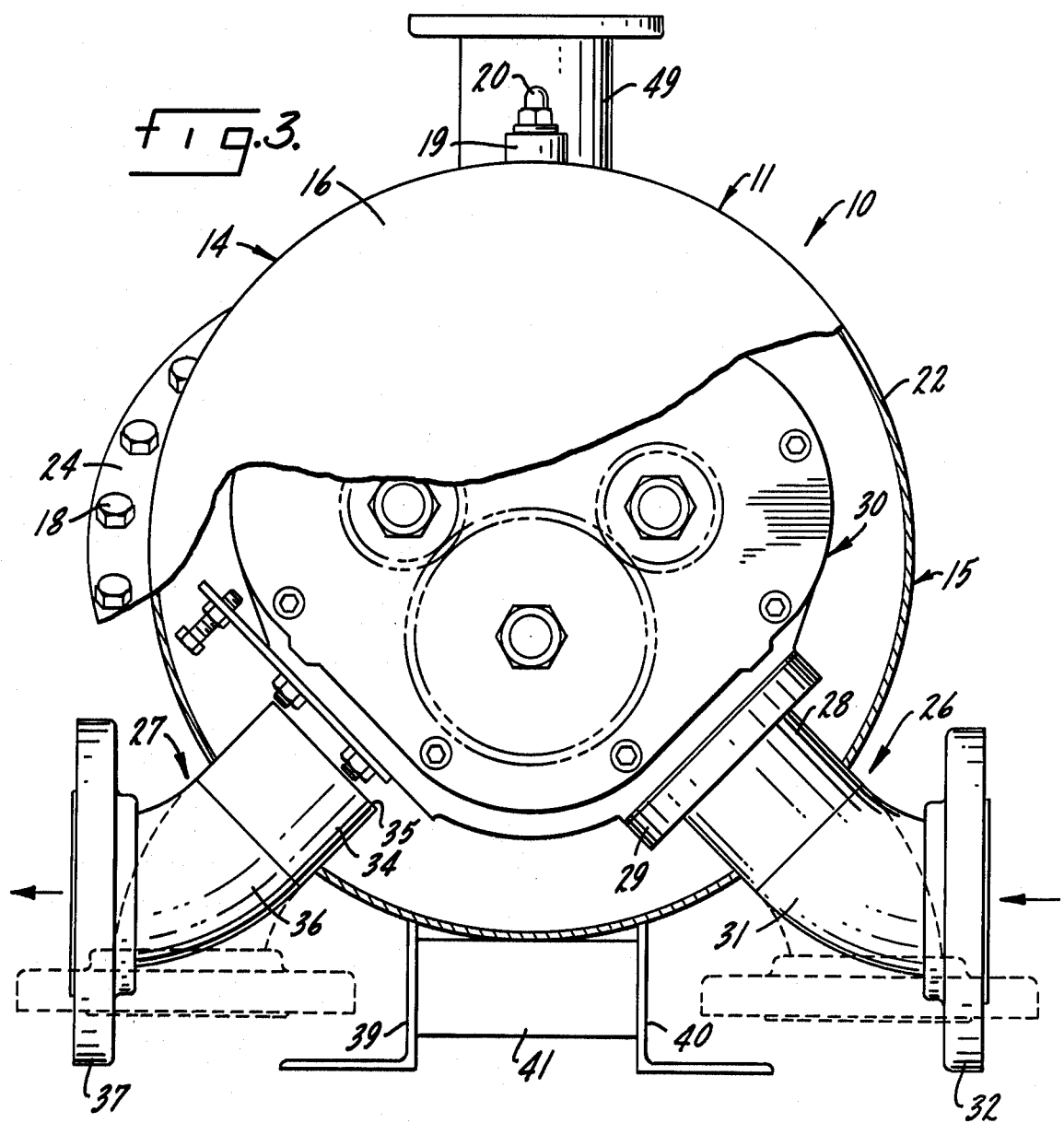
FIG. 3 is a rear view as taken from the left of FIG. 1 with parts broken away for clarity.

A fluid meter installation is indicated generally at 10 in FIG. 1. The meter installation includes a fluid meter assembly, indicated generally at 11, and associated auxiliary equipment indicated generally at 12.

The fluid meter assembly includes a housing which has a first, generally hemispherical shaped portion 14 and a second generally hemispherical shaped portion 15. For ease of description and clarity of understanding, the first portion may sometimes hereafter be referred to as the cover portion, and the second portion as a base portion.

The cover portion 14 is formed as a hemispherical section 16 which terminates at a peripheral flange 17. A plurality of apertures are formed in flange 17 which receive securing bolts 18. A pressure tap is indicated at 19 and a lifting ring at 20.

The base portion 15 includes a hemispherically contoured section 22 which terminates in a peripheral flange 23. A plurality of apertures are formed in flange 23, the apertures being so spaced as to fall in alignment with the apertures in flange 17. Upper and lower generally similarly shaped clamp rings are indicated at 24 and 25. The rings prevent scoring or distortion of the relatively thin flanges 17, 23 when the cover and base portions are secured to one another by the bolts 18 which act against the clamp rings.

As will be best noted from FIG. 1, the first and second hemispherically shaped portions make abutting contact with one another along a circular parting line, all points of which lie in a single plane. Preferably, the parting line plane is located at the maximum diameter of the housing.

Referring now to FIGS. 1 and 3, an inlet is indicated generally at 26 and an outlet at 27. Inlet 26 includes a short tubular section 28 which terminates internally in a flange 29 to which a metering device, indicated generally at 30, is mounted. Since the short tubular section 28 is rigid with respect to hemispherical portion 15 the metering device 30 is thereby fixed with respect to the hemispherical housing formed by the cover and base portions 14 and 15. The metering device may be of any suitable type and configuration so long as it is of a size to be conveniently received within the hemisphere formed by the hemispherical housing. Preferably a meter of the type illustrated and described in U.S. Letters Pat. No. 2,835,229 is employed. One significant advantage of this type of meter is that upon removal of cover portion 14 the metering device is conveniently and completely exposed to view, and maximum access is provided for inspection, adjustment and reassembly.

The short tubular section 28 of the inlet terminates, at its radially outer end, in a short partial elbow 31 which in turn terminates in a securing flange 32.

Outlet 27 includes a short tubular section 34 whose radially inner end 35 terminates, in this instance, short of contact with the metering device 30. The radially outward end of section 34 connects to a partial elbow 36 which terminates in a securing flange 37.

Means for ensuring a fluid pressure tight seal between first and second hemispherical portions 14 and 15 are indicated generally at 58. Said means includes a retainer member, indicated generally at 59, which is carried by and secured to the base portion 15. As best seen in FIG. 1, the retainer member projects upwardly a substantial distance above the parting line between the two hemispherical portions and, in this instance, is illustrated in the form of a continuous ring. It will be noted however that the structure need not be continuous, although this is the preferred form. An endless seal member which may, for example, be a neoprene o-ring, is indicated at 60. Preferably the endless seal member 60 is so sized with respect to the retainer member that it is stretched slightly circumferentially when in place on the retainer member 59. When the cover portion 14 is brought into engagement with the base portion 15, it will be noted that the junctions of flanges 17 and 23 with their associated cover and base portions 14 and 15, respectively, together with the retainer member 59, form, in effect, a chamber which totally surrounds and confines the seal member 60. As a result, the seal member conforms to the space available.

The entire fluid meter installation is supported by a pair of support flanges 39, 40 which are welded, at their upper end, to base portion 15 and are maintained in spaced relation one to the other by a spacer bar 41.

Metering device 30 includes an output shaft 44 which extends through the wall of section 22 and terminates in a gear 45 which is fast with the shaft. Suitable gearing, indicated generally at 46, in housing 47, converts the horizontal rotation of shaft 44 into vertical rotation of counter shaft 48. Counter shaft 48 extends upwardly in a tubular housing 49 of any desired length. If the housing is of substantial length, a bracket and U-bolt assembly, indicated generally at 50 may be used to provide additional support for the stack with respect to the housing assembly 13.

Any suitable auxiliary equipment may be mounted on the support stack, depending upon the particular application to which the assembly is applied. In this instance only a counter, indicated generally at 52, has been illustrated. It will be understood however that any suitable auxiliary equipment such as an electrical tachometer, a pre-set valve, a gross counter, a temperature volume compensator, a net counter and/or a ticket printer may be employed as required, all of which is within the skill of the art. Although it will be noted that in this instance the stack 49 extends at right angles to a line coincident with the nominal left to right flow path of fluid passing through the device, the position of the stack with respect to the balance of the meter installation may be varied as required. For example, and referring to FIG. 2 in particular, an additional set of four stack securement bolt holes are indicated at 53, 54, 55 and 56 at locations mid-way between the illustrated locations. This arrangement enables the stack to be located, if the environment so requires, at any position which is a multiple of 45 degrees from the illustrated position of the stack with respect to the balance of the meter installation.

The use and operation of the invention is as follows.

In order to provide a fluid meter installation having a maximum strength to weight ratio, the housing for the meter is formed from two substantially identical hemispherical portions 14 and 15. These portions are secured to one another along a maximum circle of contact by a plurality of securing bolts 18, which clamp the portions together in abutting relationship by means of pressure rings 24 and 25 acting on abutting flanges 17 and 23.

A yieldable, deformable continuous sealing member, such as the endless O-ring seal 60, precludes any leakage between the flanges 17 and 23.

Preferably the retainer member 59 which carries the O-ring 60 is carried by the base portion 15 so that when the cover and base portions 14 and 15 are separated for inspection or any other reason, the O-ring is retained in position on the stationary one of said base and cover portions. As a result, there is opportunity of the sealing member being last, and the device being reassembled without the sealing member is minimized.

The fluid meter installation can be so assembled as to adapt to any one of a large number of fluid flow arrangements.

For example, in the fluid flow setting illustrated in FIGS. 1 and 3 the direction of fluid flow at both the inlet and the outlet is substantially co-linear, as indicated by the direction of the arrows. However, if the directional flow of the inlet fluid in a different environment is disposed 90° from the directional flow indicated in FIG. 3, the elbow 31 may be secured to tubular section 28 in a position 180° opposite to that shown in the solid lines. This will result in placement of securing flange 32 in the dotted line position of FIG. 3. Elbow 36 of the outlet 27 may likewise be located in the dotted line position. It will therefore be noted that FIG. 3 illustrates four different flow orientations, namely, (1) horizontal, (2) vertical in and horizontal out, (3) horizontal in and vertical out, and (4) vertical in and vertical out.

Figure 4:
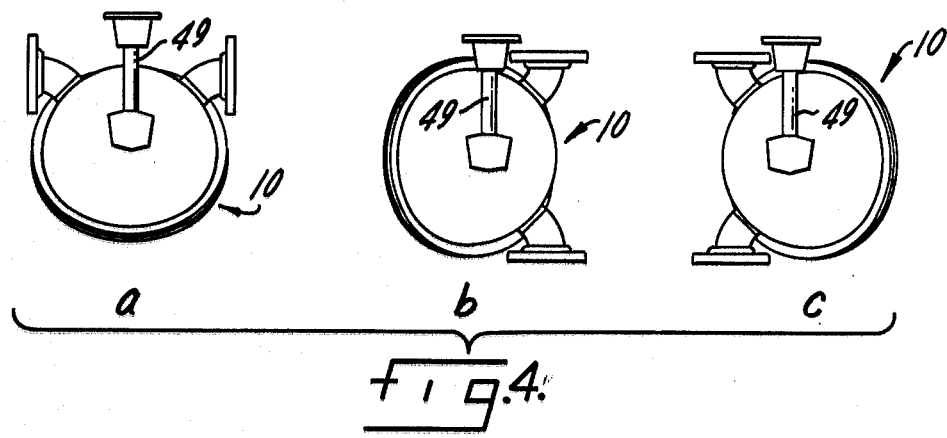
FIG. 4 is a schematic diagram of the meter assembly installed in three dissimilar basic positions as contrasted to the basic position of FIGS. 1 and 3.

The versatility of the installation is apparent when it is appreciated, as illustrated in FIG. 4, that the entire assembly can be inverted 180° as illustrated in position 4a, or oriented vertically with connections right as in position 4b or with connections left as illustrated in FIG. 4c. And of course within each of positions 4a, 4b, and 4c the elbow orientations illustrated in connection with FIG. 3 are available so that a minimum of 16 different positions of the metering device and orientations of fluid flow with respect to the stack structure 49 are possible.

As illustrated, the structure functions as a single chamber unit since there is no connection between the radially inward end 35 of tubular section 34 and the outlet of metering device 30. However by securing a short bellows or sleeve type seal to the inner end 35 of tubular section 34 and the outlet of metering device 30, two chamber operations can be provided. Thus, one fluid can be present within the housing and outside the metering device 30, and a dissimilar fluid can be present within metering device 30. Preferably a slight pressure differential should be maintained between the two fluids, with the greater pressure applied to the fluid surrounding metering device 30. Obviously a fluid which is compatible with the fluid being metered, should be employed as for example coconut oil if a sugar and water solution is being metered. By means of the pressure tap 19 a slightly higher pressure can be maintained in the external fluid than in the internal fluid.

The hemispherical construction permits a material having a high inherent strength, such as steel, to be used.

At the same time the substantially great unit weight of steel as compared with other materials is minimized by virtue of the hemispherical configuration which, from a design standpoint, provides maximum strength per unit weight.

The housing is preferably formed into the illustrated shape. If proper procedures are followed, a cast structure should function equally as well. However, as a practical matter a formed structure is prefered.

Although a preferred embodiment of the invention has been illustrated and described, it will at once be apparent to those skilled in the art that various modifications and improvements may be made without departing from the essential spirit and scope of the inventive concept. Accordingly it is intended that the scope of the invention be limited solely by the scope of the hereinafter appended claims as interpreted in light of the pertinent prior art.

We claim:

1. In a fluid meter system, a meter, said meter including displacement mechanism, and a meter housing which encloses said displacement mechanism, said meter housing having an inlet and an outlet, an outer housing for supporting and enclosing the meter, said outer housing being non-integral with the meter and including a first, generally hemispherically shaped portion, and a second, generally hemispherically shaped portion, said first and second hemispherically shaped portions being constructed and adapted to make abutting contact one to the other along a parting line which generally bisects the hemispherical configuration formed by said portions when assembled one to another, said parting line lying substantially in a single plane, each of said hemispherically shaped portions having a peripheral flange, each of said peripheral flanges extending radially outwardly from the center portion of its associated hemispherical portion and being adapted to make abutting contact one to the other when said hemispherical portions are assembled, an inlet opening and an outlet opening in one of the said hemispherical portions only, seal means carried by one of said housing portions for making a fluid tight pressure seal with the other of said housing portions, said inlet opening and said outlet opening being arranged ralative to one another such that a unidirectional line passing through the central portion of the inlet opening and the outlet opening does not intersect the generally circular plane formed by the parting line, a rigid, upstream conduit in the said one outer housing portion terminating, at its interior, downstream end, at a location within the said one outer housing portion and, at its exterior, upstream end, at a location outside the said one outer housing portion, means for mounting said meter on the interior, downstream end of said rigid conduit and thereby in a fixed position with respect to the outer housing and in communication with said outer housing inlet, said mounting means including structure for orienting the meter in any desired one of a plurality of positions with respect to the horizontal, including a position in which the inlet and outlet openings in the said one hemispherical portion are each located vertically above the meter, a rigid downstream conduit carried by the said one outer housing portion, said rigid downstream conduit terminating, at its upstream end, at a location in communication with the interior of the housing and, at its downstream end, at a location outside the said one outer housing portion, a rigid inlet connector, said inlet connector being connectable to the rigid, upstream conduit in such fashion that the inlet end of the rigid inlet connector can be disposed in a plurality of positions, a rigid, outlet connector, said outlet connector being connectable to the rigid downstream conduit in such fashion that the outlet end of the rigid outlet elbow can be disposed in a plurality of positions, whereby fluid may be admitted to the outer housing from a plurality of approach directions, and discharged in a plurality of departure directions irrespective of the approach direction, including a position in which fluid is admitted to, and discharged from, the outer housing from an elevation above the meter, and meter counting shaft means extending outwardly from said metering device and through the wall of said housing in sealed relationship therewith and into contact with auxiliary equipment irrespective of the relative position of the meter to the inlet and outlet openings of the said one hemispherical portion.

2. The fluid meter system of claim 1 further including an auxiliary connector for connecting the meter outlet to the upstream end of the rigid, downstream conduit in fluid tight relationship whereby the meter forms an enclosed, fluid tight chamber within the outer, fluid tight chamber formed by the hemispherical portions so that a fluid dissimilar to the fluid being metered can surround, yet remain out of physical contact with, the metered fluid.

* * * * *